(12) United States Patent
Campolo et al.

(10) Patent No.: US 7,532,444 B2
(45) Date of Patent: May 12, 2009

(54) LEAKAGE CURRENT MONITOR

(75) Inventors: Steve Campolo, Malverne, NY (US); Kenneth J. Brown, Chula Vista, CA (US); Carlos G. Ramirez, San Diego, CA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/608,671

(22) Filed: Dec. 8, 2006

(65) Prior Publication Data

US 2008/0049364 A1    Feb. 28, 2008

Related U.S. Application Data

(60) Provisional application No. 60/787,479, filed on Mar. 30, 2006.

(51) Int. Cl.
*H02H 3/00* (2006.01)

(52) U.S. Cl. ............................................ 361/42

(58) Field of Classification Search ................ 361/42, 361/44–50
See application file for complete search history.

(56) References Cited

U.S. PATENT DOCUMENTS

| | | | |
|---|---|---|---|
| 6,473,281 B1 * | 10/2002 | Kornblit | 361/42 |
| 6,644,986 B1 * | 11/2003 | Wilker, Sr. | 439/106 |
| 6,829,123 B2 * | 12/2004 | Legatti et al. | 361/1 |
| 6,991,495 B1 * | 1/2006 | Aromin | 439/620.08 |
| 2002/0187682 A1 * | 12/2002 | Lincoln et al. | 439/652 |
| 2005/0180069 A1 * | 8/2005 | Tchernobrivets | 361/46 |

\* cited by examiner

*Primary Examiner*—Stephen W Jackson
*Assistant Examiner*—Terrence R Willoughby
(74) *Attorney, Agent, or Firm*—Kathryn M. Milam; Paul F. Rusyn; Graybeal Jackson LLP

(57) ABSTRACT

A leakage current monitor device suitable for use in or with a Relocatable Power Tap. The device includes a leakage current detector circuit and an alarm circuit coupled thereto. The leakage current detector circuit is configured to detect leakage current from one or more loads connected to the RPT. The alarm circuit activates an alarm device when a detected leakage current exceeds a defined threshold.

12 Claims, 2 Drawing Sheets

LEAKAGE CURRENT MONITOR

This application claims priority pursuant to 35 U.S.C. 119 (e) from U.S. Provisional Application having Application No. 60/787,479 filed Mar. 30, 2006.

BACKGROUND OF THE INVENTION

1. Field of the Invention

This invention relates to power strip, also referred to as Relocatable Power Tap (RPT) having a Ground Leakage Monitor.

2. Description of the Related Art

Outlet strips or power strips, also referred to as Relocatable Power Tap (RPT) devices, are used to make access to electrical power more convenient. A typical RPT has several outlets each with line, neutral and ground connected via a conductor to a 3-wire plug for insertion into a wall outlet. The RPTs are rated at 250 volts or less and 20 amps or less. The grounding pin of the RPT plug serves to route potentially hazardous leakage current to ground.

The use of RPTs in hospitals and other patient care facilities has raised safety concerns primarily because of the increased risk of electric shock. For example, when several pieces of electrical equipment are plugged into an RPT, they are all connected to a single branch circuit via the attached conductor and plug inserted into a wall outlet. It is the grounding pin on the attached plug which is used to route potentially hazardous leakage current to ground. Since each connected electrical device does contribute an amount of leakage current to ground, the accumulated leakage current of several connected devices could create a risk of electric shock to a patient. Generally, the total leakage current is unknown, but in many instances, can exceed an upper permitted level which is typically 300 μA. Furthermore, as noted in the Underwriters Laboratories publication titled "The Code Authority" (spring 2004), if the grounding pin of the RPT attachment plug were damaged or removed, the accumulated leakage current of several connected electrical devices could create the risk of electrical shock. These concerns have caused RPTs to be considered unsuitable for use in a patient care environment.

Accordingly, there is a need for an improved RPT which can detect and monitor leakage current and, thus, can be used in hospitals and similar locations.

SUMMARY OF THE INVENTION

The present invention addresses the above described need by providing a leakage current monitor suitable for use in or with a user accessible power source such as a Relocatable Power Tap. The leakage current monitor includes a leakage current detector circuit and an alarm circuit coupled thereto. The leakage current detector circuit is configured to detect leakage current from one or more loads connected to the user accessible power source (i.e., RPT) and the alarm circuit, which is electrically coupled to the detector circuit, is configured to activate an audio and/or visual device when the leakage current exceeds a defined threshold.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. While the present invention is embodied in hardware, alternate equivalent embodiments may employ, whether in whole or in part, firmware and software. Those skilled in the art should also realize that such equivalent constructions do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which:

DETAILED DESCRIPTION

Figure 1:
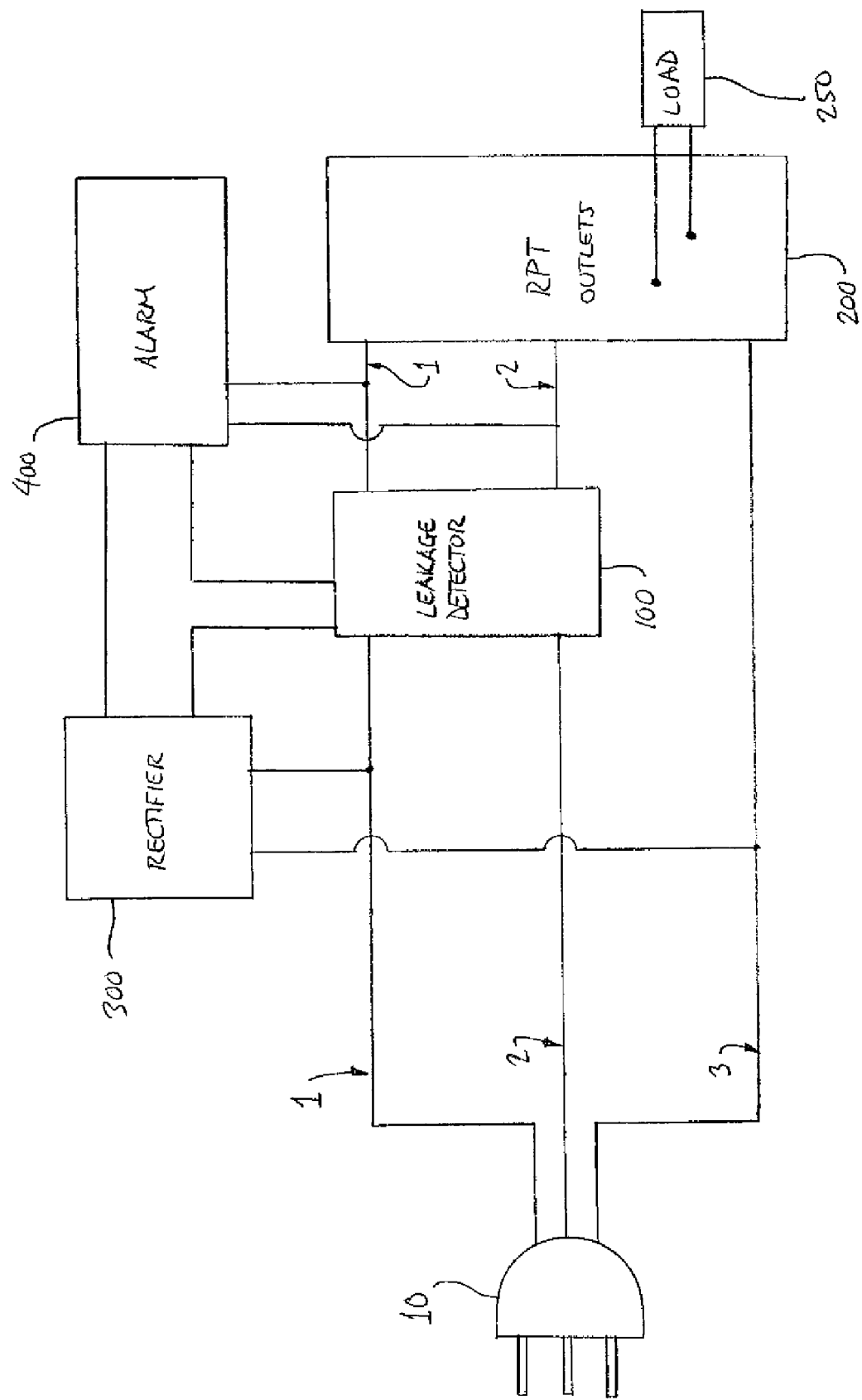
FIG. 1 is a block diagram of an Relocatable Power Tap device including a leakage current detector and alarm circuit, in accordance with the principles of the invention.

FIG. 1 is a block diagram illustrating the major components of an embodiment of the leakage current monitor device of the present invention. In the description below, the operation of the current monitor device of the present invention is described in the context of an RPT connected to the device. It is to be understood, however, that the leakage current monitor device here disclosed can be interfaced with other types of outlet devices. A conventional plug 10 having a phase blade, a neutral blade and a ground pin for connection to a wall outlet provides connections to line, neutral and ground conductors 1, 2, 3 respectively. Any leakage current between line conductor 1 and ground conductor 3, or between neutral conductor 2 and ground conductor 3 is detected by a leakage current detector circuit 100. Leakage current detector circuit 100 also detects leakage between line and ground, or between neutral and ground, due to a load device 250, or more than one load device, plugged into one of the outlets in the RPT 200. Each outlet in the RPT 200 is connected to the line, neutral and ground conductors 1, 2, 3. A power supply circuit 300 provides power to the leakage detector circuit 100 and alarm circuit 400. Power supply circuit 300 may conveniently be configured as a rectifier circuit (with associated filtering circuitry) connected to line conductor 1 and ground conductor 3 as its inputs. Alarm circuit 400 activates alarm devices when the allowable leakage current exceeds a threshold in accordance with a signal from leakage detector circuit 100. A threshold is here defined as the leakage current value above which an alarm device is activated as a result of a signal from the detection circuit. The threshold value can be altered or modified through programming of components and/or circuitry or through the particular values of electronic/electrical components of the detection circuit.

Figure 2:
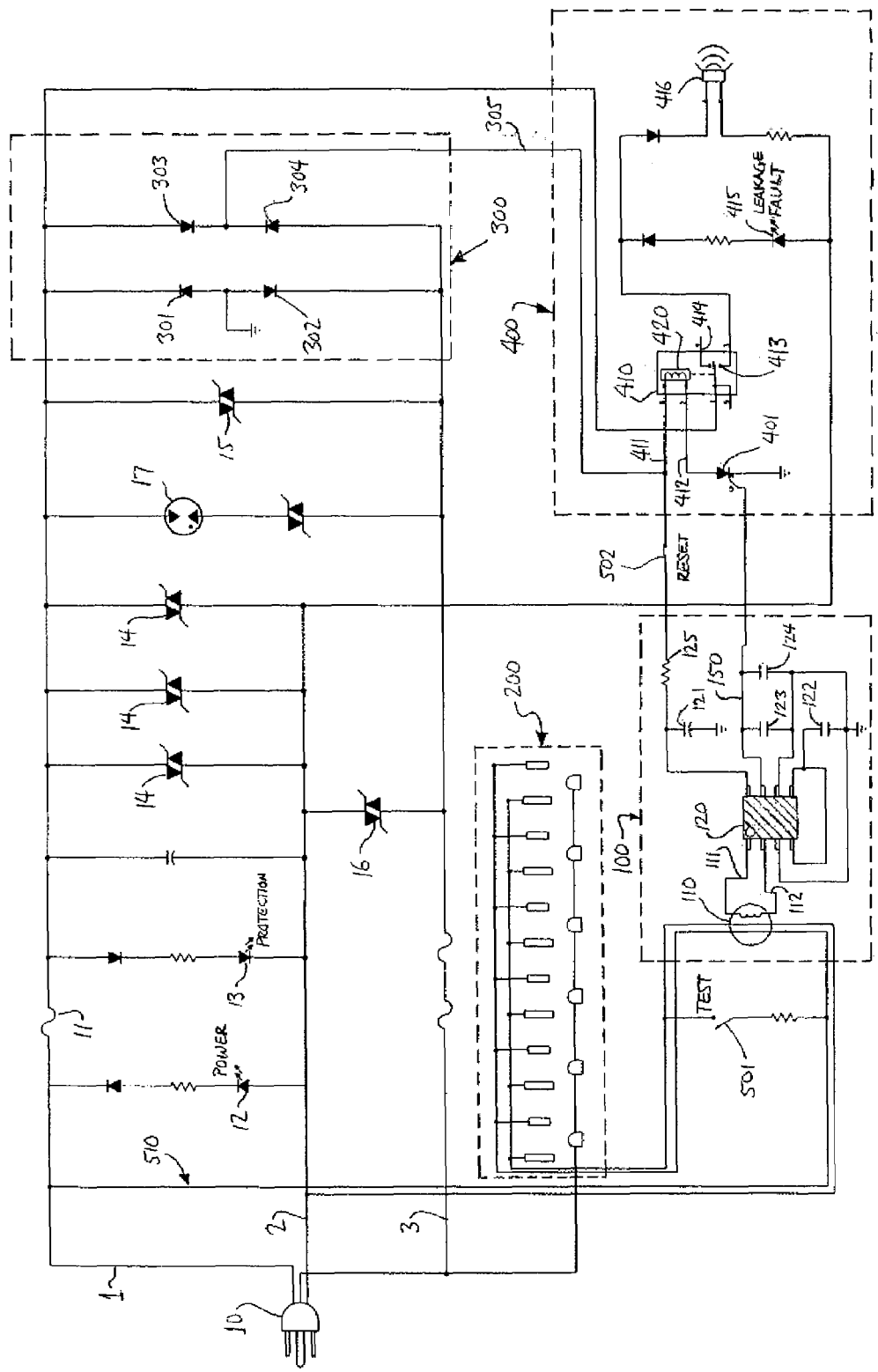
FIG. 2 is an electrical schematic diagram of the Relocatable Power Tap device of FIG. 1.

FIG. 2 is a schematic diagram of an RPT including a leakage current detector in accordance with an embodiment of the invention. As in FIG. 1, the 3-wire plug 10 provides connections to line, neutral and ground conductors 1, 2, 3. Thermal Cut-Off (TCO) devices 11 (e.g. fuses) protect the RPT device against excessive loads. An LED 12 (labeled "Power") illuminates to indicate the presence of line voltage between conductors 1 and 2. Another LED 13 (labeled "Protection") illuminates to indicate that the TCO 11 has not opened and is providing protection to the device. Metal-Oxide Varistors (MOVs) 14, 15, 16 are located between line and neutral, line and ground, and neutral and ground respectively, to provide protection against transient high-voltage pulses. In addition, a high-breakdown-voltage tube (gas tube arrester) 17 in series with an MOV is provided between the line and ground conductors.

In this embodiment, the leakage current detector circuit 100 detects leakage currents between the line conductor and ground and between the neutral conductor and ground, which in turn may be connected to one or more load devices at the RPT outlets 200. The line and neutral conductors 1, 2 are fed through the coil of a differential transformer (also called a Zero Current Transformer or ZCT) 110. As is understood by those skilled in the art, any leakage current from conductors 1 and/or 2 to ground (whether in the RPT itself, or in a load device plugged into one of the outlets) which results in an imbalance of current in the ZCT coil will cause a voltage to appear between ZCT leads 111 and 112. These leads are connected as input terminals of leakage detector/amplifier unit 120, such as Earth Leakage Detector KA2803B from Fairchild Semiconductor Corporation. Capacitances 122 and 123 provide noise cancellation for the leakage detector unit 120. The combination of capacitances 123 and 124, located between output lead 150 and ground, determines the speed of response of detector unit 120 to a leakage current sensed by ZCT 110.

Diodes 301-304 are connected to form a bridge full-wave rectifier circuit 300 between line conductor 1 and ground conductor 3. The rectified output voltage appears on conductor 305 and is applied to detector unit 120 and to conductor 411 of relay coil 420 of alarm circuit 400. The values of capacitance 121 and resistance 125 are chosen to provide a voltage of substantially 12 V to detector unit 120.

When ZCT 110 detects a current differential (due to current leakage from conductors 1 and/or 2 to ground) that exceeds a defined sensing threshold (e.g. 300 μA), detector unit 120 causes a voltage to appear at output lead 150. This voltage is applied to the gate terminal of Silicon-Controlled Rectifier (SCR) 401 to allow the SCR to conduct current between its cathode and its anode. This effectively grounds terminal 412 of coil 420 in relay 410, causing current to flow through the coil and thereby closing normally-open relay contact 413. This in turn connects the alarm devices in alarm circuit 400 to line conductor 1. Accordingly, detection of a leakage current exceeding the allowed threshold causes LED 415 (labeled "Leakage Fault") to illuminate and audible alarm 416 to sound.

The embodiment shown in FIG. 2 also includes test and reset features of the device. Switch 501 is normally open; when closed (TEST) it forms a path for current between line and neutral conductors 1, 2 to simulate a leakage current condition. This leakage current is detected by circuit 100, causing the alarm devices to turn on.

Reset switch 502 is normally closed. When reset switch 502 is opened, the power supply to detector unit 120 is disconnected and the voltage signal on output lead 150 is turned off, and SCR 401 and relay coil 420 return to their non-conducting state. This in turn causes relay contact 413 to open, disconnecting the alarm circuit 400 from line conductor 1.

It is to be noted that in this embodiment, visual and audio alarms are turned on when the allowable leakage current is exceeded, but AC power to the load plugged into the RPT is not interrupted. It will be appreciated that when the device here disclosed is used in a hospital, the load device may be required for patient care. Accordingly, the user of the device will be alerted when there is excessive leakage current, but will make an independent judgment regarding if and/or when to disconnect the device. Alternatively, relay 410 may be configured to automatically disconnect line conductor 1 (e.g. by routing circuit branch 510 in series with normally-closed relay contact 414) in the event of excessive leakage current.

In this embodiment, the alarm circuit includes an LED and/or an audible device such as a buzzer, a bell or the like. Other combinations of alarm devices may be used as appropriate to the operating environment.

The RPT device of the above-described embodiment includes a current leakage monitoring and alarm circuits integrated with RPT power outlets. It will be appreciated, however, that the leakage detector circuit 100 and alarm circuit 400 (together with the rectifier circuit 300 providing power thereto) may be built as a separate unit and then incorporated into any existing RPT.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

While there has been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

What is claimed is:

1. A Relocatable Power Tap including line, neutral, and ground conductors coupled to a plurality of outlets, the Relocatable Power Tap, comprising:
    a leakage current detector circuit; and
    an alarm circuit coupled to the leakage current detector circuit, wherein
    the leakage current detector circuit is configured to detect a leakage current from the line conductor and/or the neutral conductor to the ground conductor of the Relocatable Power Tap,
    the alarm circuit is configured to generate an alarm signal upon detection of a leakage current exceeding a defined threshold by the leakage current detector, and
    the Relocatable Power Tap is operable to continue to supply power to outlets when the leakage current exceeds the defined threshold.

2. The Relocatable Power Tap of claim 1 further comprising a visual alarm device coupled to be activated by said alarm circuit.

3. The Relocatable Power Tap of claim 2 wherein said visual alarm is an LED.

4. The Relocatable Power Tap of claim 1 further comprising an audio alarm device coupled to be activated by said alarm circuit.

5. The Relocatable Power Tap of claim 4 wherein said audio alarm device comprises a bell.

6. The Relocatable Power Tap of claim 4 wherein said audio alarm device comprises a buzzer.

7. The Relocatable Power Tap of claim 1 wherein said alarm circuit comprises a normally open relay.

8. The Relocatable Power Tap of claim 1 wherein said leakage current detector circuit comprises a differential transformer coupled to line and neutral conductors of the Relocatable Power Tap and to input terminals of a leakage detector/amplifier.

9. The Relocatable Power Tap of claim 1 wherein actual interruption of power to said load is determined by a user, regardless of the state of operation of said alarm circuit.

10. The Relocatable Power Tap of claim 9 wherein power to said load is interrupted only by manually disconnecting said Relocatable Power Tap from a source of power.

11. The Relocatable Power Tap of claim 9 wherein power to said load is interrupted only by manually disconnecting said load from said Relocatable Power Tap.

12. A Relocatable Power Tap including line, neutral, and ground conductors coupled to a plurality of outlets, the Relocatable Power Tap, comprising:

a leakage current detector circuit;

an alarm circuit coupled to the leakage current detector circuit, wherein the leakage current detector circuit is configured to detect a leakage current from the line conductor and/or the neutral conductor to the ground conductor of the Relocatable Power Tap, the alarm circuit is configured to generate an alarm signal upon detection of a leakage current exceeding a defined threshold by the leakage current detector, and the Relocatable Power Tap is operable to continue to supply power to outlets when the leakage current exceeds the defined threshold; and wherein the defined threshold is approximately 300 µA.

* * * * *